Oct. 20, 1970 F. BRETTI 3,534,894

TAPE CASSETTE

Filed Dec. 2, 1968 3 Sheets-Sheet 1

*INVENTOR.*
FRANCO BRETTI

Oct. 20, 1970 F. BRETTI 3,534,894

TAPE CASSETTE

Filed Dec. 2, 1968 3 Sheets--Sheet 2

INVENTOR.
FRANCO BRETTI

Oct. 20, 1970 F. BRETTI 3,534,894

TAPE CASSETTE

Filed Dec. 2, 1968 3 Sheets-Sheet 3

*INVENTOR.*
FRANCO BRETTI

United States Patent Office 3,534,894
Patented Oct. 20, 1970

3,534,894

TAPE CASSETTE

Franco Bretti, Are' di Caluso, Italy, assignor to Ing. C. Olivetti & C., S.p.A., Ivrea, Italy, a corporation of Italy Filed Dec. 2, 1968, Ser. No. 785,435
Claims priority, application Italy, Dec. 1, 1967, 53,944/67
Int. Cl. G11b *15/29*
U.S. Cl. 226—182 11 Claims

ABSTRACT OF THE DISCLOSURE

A tape cassette and drive mechanism therefor wherein the cassette includes a roller for driving tape and having an axial cavity therein, and the driving mechanism includes a driving shaft frictionally engageable with the roller internally of the cavity, the diameter of the shaft being less than the diameter of the cavity so that the shaft engages the roller along a generatrix of the cavity.

BACKGROUND OF THE INVENTION

Field of the invention

The present invention relates to a tape storage device of the interchangeable cassette type.

Description of the prior art

Various types of cassettes are known in which an endless belt of tape is stored in random loops in a compartment having the form of a case with a thickness slightly greater than the width of the tape itself.

In each kind of cassette the internally enclosed tape, which is usually magnetic, must be read and recorded on by a head for reading and recording, respectively; moreover, the tape itself must be moved at a constant speed during the reading and recording operations; furthermore, the tape must be made to start and stop in a rather short time in order that the reading and recording of the data on the tape may take place without the loss of part of the data. Various means are known for performing the above-described functions. In some known cases, the tape is partly enclosed in the cassette, which has apertures through which a head can come into contact with the surface of the tape from outside, thus permitting reading thereof and recording thereon. In the same way, the driving of the tape is effected by bringing a part of the surface of the tape which emerges from the cartridge up to a driving roller which is driven from an external motor. In other cases, the cassette is divided into two housings, the first housing containing the tape bunched in so many folds or loops. The first housing communicates through two apertures, an entry aperture and an exit aperture, formed in a dividing wall with the second housing, which contains the reading and recording head. Also located in the housing containing the head is a roller over which the tape can run and a portion of which projects from the cartridge and can be coupled with another roller, this being an external driving roller, in this way driving the tape by friction.

In these cartridges, either the reading and recording function or the driving function requires the tape to be exposed from the cassette, thereby permitting dust and other atmospheric agents to impair the surface of the tape and thus increase, on the one hand, the wear of the tape and, on the other hand, the possibility of a recording and/or reading error. Moreover, it is difficult to fit the cassette on the driving unit, this entailing the need to center and rotate the cassette itself.

SUMMARY OF THE INVENTION

The object of the present invention is to overcome such disadvantages.

According to the invention there is provided a tape cassette and drive mechanism therefor wherein the cassette includes a roller for driving the tape and the roller has an axial cavity in which a driving shaft is engageable, the shaft having a smaller diameter than the cavity and being adapted to engage frictionally with the roller along a generatrix of the cavity.

The invention will be described in more detail, by way of example, with reference to the accompanying drawings.

DESCRIPTION OF THE PREFERRED EMBODIMENT

Figure 1:
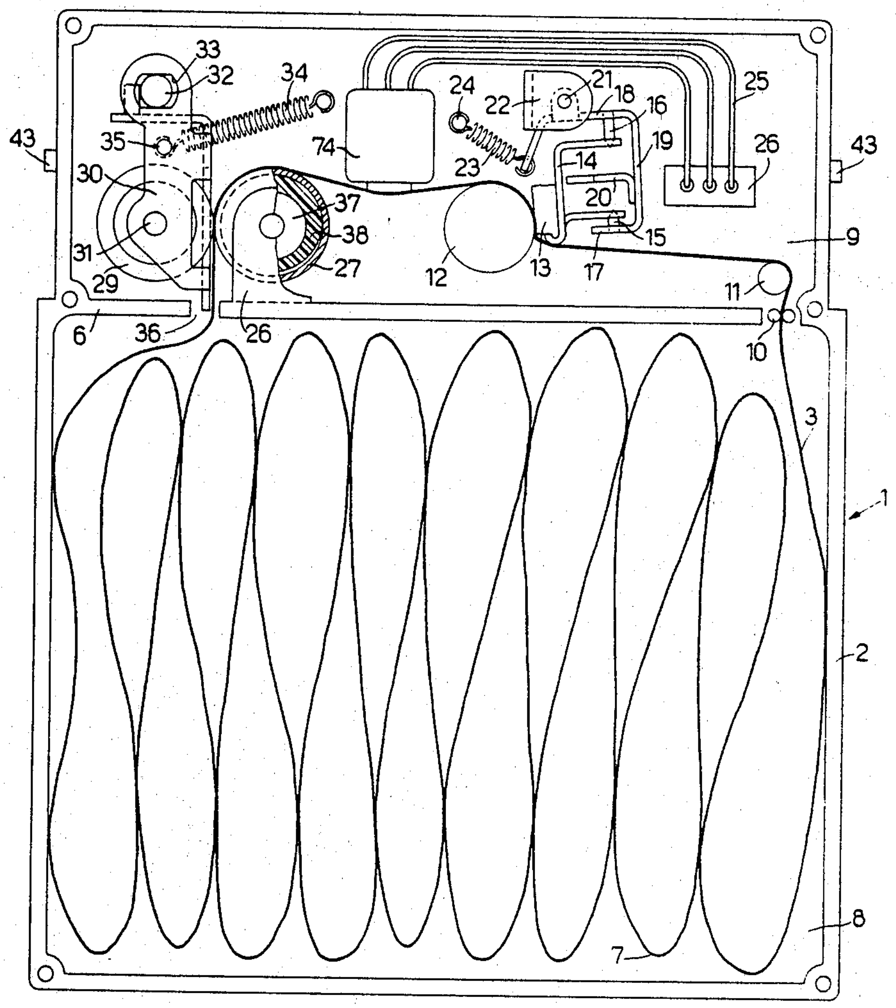
FIG. 1 is a section of a cassette embodying the invention.

The cassette 1 comprises a case 2 of rigid material which has a thickness slightly greater than the width of the tape used and which contains internally an endless belt of magnetic tape 3, an electro-magnetic head 74 and driving and guide means for transporting the tape and causing it to cooperate with the head. A cover plate 5 of glass or transparent plastic is fixed to the case 2 by means of screws to prevent exposure of the various components to dust and external agents and at the same time allow the inside of the cassette to be seen. The case 2 is divided into two housings by a wall 6. The magnetic tape has the form of an endless belt folded into loops 7 in the housing 8 and enters the housing 9 between two guide pins 10 to be deflected round a pin 11 towards a fixed cylinder 12 over which the tape is slideable. Against the tape on the fixed cylinder there is pressed a felt pad 13 mounted on a bridge 14 having two arms pivoted on the pivots 15 and 16, respectively. These two pivots are on the same axis, about which the felt pad can turn and thereby adapt itself automatically to the possible wandering movements of the tape on the cylinder 12 without varying the constant pressure exerted on the cylinder. The two pivots 15 and 16 are fixed to arms 17 and 18 of another bridge 19 carrying a third arm 20 which serves as a stop limiting the possible rotation of the bridge 14. The arm 18 and therefore the entire bridge 19 is pivoted on a conical pivot 21 fixed to a bracket 22 and a pull is exerted thereon by a spring 23 fixed to the case with the aid of a stud 24. The entire bridge system fulcrumed on the pivot 21 and pulled by the spring 23 exerts a constant pressure on the fixed cylinder 12 and is able to adapt itself to those movements of the tape on the cylinder which are different from a longitudinal sliding action. The magnetic tape 3 then passes below a head 74 which may be of any type and from which there emerge electric leads 25 assembled in a plug 26 which can be connected, for example, to an external reading and recording control system. After passing below the head, the tape passes over a driving roller 27 supported by a bracket 28. The tape is constantly pressed against the driving roller by a pressure roller 29 which may be made of rubber or similar material.

The roller 29 is supported by a fork 30 by means of a pin 31 about which the roller rotates. The fork 30 is fulcrumed in turn on a pivot 32 seated in a slot 33 which allows the fork, and consequently the roller 29, a turning movement about an axis at right angles to the pivot 32 in order to follow the possible wandering movements of the tape and keep the pressure between the two rollers constant. The pressure between the two rollers is maintained by means of a spring 34 attached to a stud 35 fixed to the fork 30, the spring pulling the entire system including the fork 30 and the roller 29 against the tape running over the hollow roller 27. The tension to which the tape is subjected during the journey which it makes between the fixed cylinder 12 and the roller 27 always remains the same due to the braking pad 13 and the pressure roller 29, as a result of which the speed of the tape between the fixed cylinder 12 and the roller 29 is constant and therefore does not cause any loss of information during the reading and/or recording operations performed by the head 74. The tape then reenters the housing 8 through an aperture 36 formed in the wall 6.

The driving of the tape is effected by the friction which is exerted between the roller 29 mounted freely on the pin 31 and the driving roller 27. The rotation of the roller 27 is obtained in the same way by friction. In fact, the roller 27 is hollow and can be coupled to a driving shaft 37 covered with a layer 38 of rubber or other elastomeric material having a diameter slightly smaller than the diameter of the aforesaid cavity. It would equally be possible to line the cavity with elastomeric material.

Figure 2:
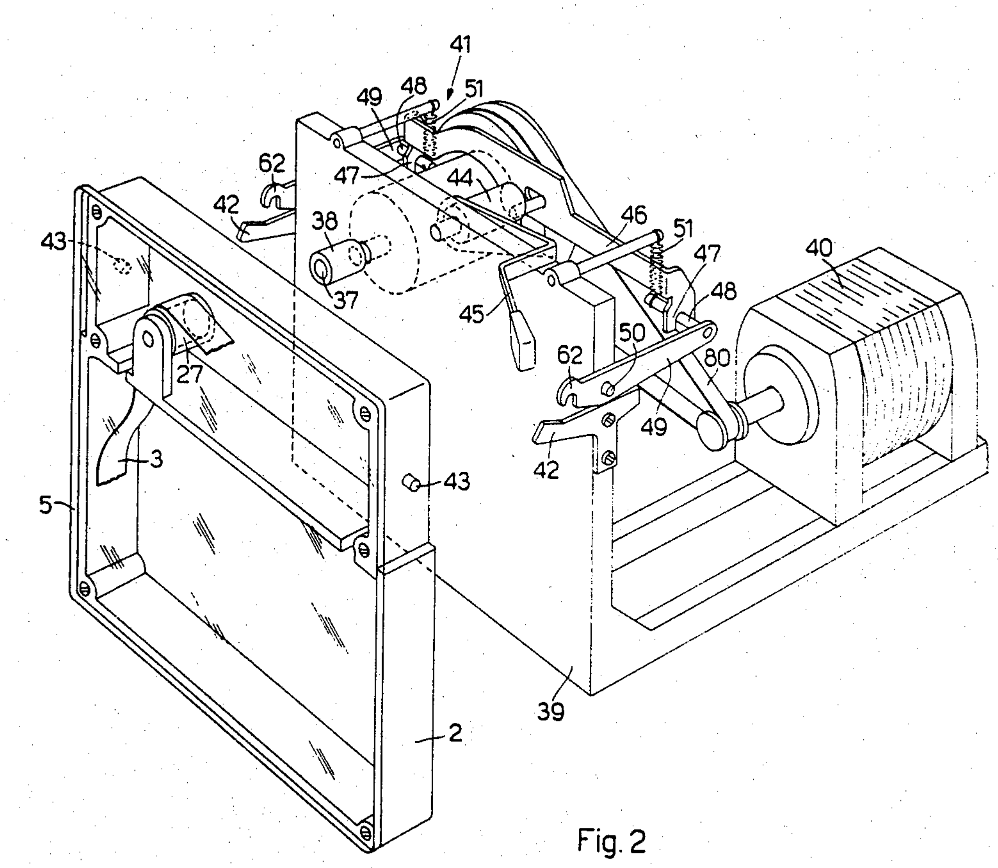
FIG. 2 shows the connecting device for effecting coupling between the driving shaft and the driving roller of the cassette.

As can be seen in FIG. 1, in which the difference between the diameters concerned has been exaggerated for greater understanding, the coupling takes place over an arc defined by the inside surface of the cavity of the driving roller, so that there is no need to center the cavity of the driving roller with respect to the driving shaft. In order to effect the coupling between the shaft 37 and the roller 27, a mechanism as shown diagrammatically in FIG. 2 is employed.

On a supporting frame 39 which holds a motor 40 and a device 41 for controlling the starting and stopping of the tape there are fixed laterally and at the same height two fixed guides 42 adapted to direct small pins 43 projecting from the case 2 of the cassette. In the middle of the frame 39 there is pivoted a roller 44 carrying on its own axis the arm of a crank 45 which can cause the roller to rotate through 180°. Fulcrumed on the roller 44 by means of a pin **44*a* which is eccentric with respect to the axis of the roller is a bail 46 terminating in two forks 47 engaging two pins 48. These two pins 48 are respectively fast with two movable guides 49 terminating in two hooks 62 which are fulcrumed on two pins 50 fixed to the frame 39. Through the medium of the two pins 48, a pull is exerted on the two guides 49 by two springs 51 fixed to the frame 39. In the inoperative position, that is with the crank 45 rotated towards the right and bearing on the top surface of the frame 39, the two fixed guides 42 and the two hooks 62 are at the maximum distance apart. In fact, the rotation of the crank to the right causes the eccentric pin 44*a* to rotate in such manner that the bail 46 is lowered, so that the two forks 47 push the pins 48 and, opposing the action of the two springs 51, cause the two hooks 62 to be raised, the two movable guides 49 being fulcrumed at 50. When the cassette 1 is inserted and the small pins 43 are inserted in the gap between the pairs of guides 42 and 49, the driving shaft 37 is inserted in the cavity of the driving roller 27 inside the cassette in such manner as to support the whole cassette 1 by supporting the driving roller 27. In order to effect the coupling between the layer 38 of rubber or similar material covering the shaft 37 and the inside surface of the cavity of the driving roller 27, the crank 45 is turned to the left through 180° to rest again on the top surface of the frame 39. By rotating the crank 45 through 180°, the roller 44 is also rotated through 180°, thereby producing the maximum raising of the bail 46. The springs 51 are left free to pull on the movable guides 49 which being fulcrumed at 50, are able to engage the small pins 43 of the cassette 1 by means of the hooks 62, loading the pins with a downward thrust determined by the upward pull due to the springs. This downward thrust produces a constant coupling along an arc defined by the surface of the cavity of the driving roller 27 and by the layer 38 covering the driving shaft 37**. The movement is therefore transmitted constantly through friction from the driving shaft to the driving roller inside the cassette without any need for adjustments of centering.

In order to remove the cassette and uncouple it from the motor, it is sufficient to rotate the crank 45 to the right through 180° and thus disengage the hooks 62 from the pins 43, thereby leaving the cassette free.

Figure 3:
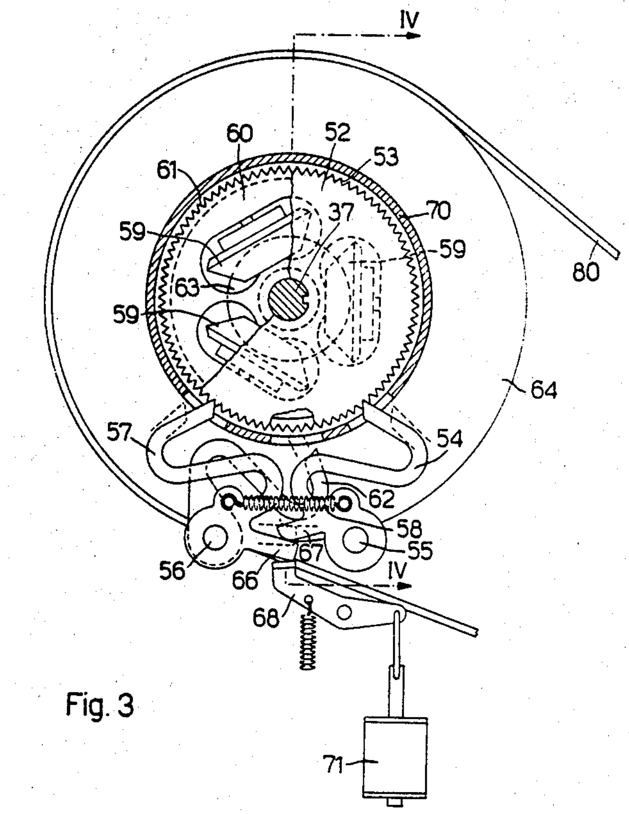
FIG. 3 shows two circular toothed rims and starting and stopping pawls of the tape driving device.
Figure 4:
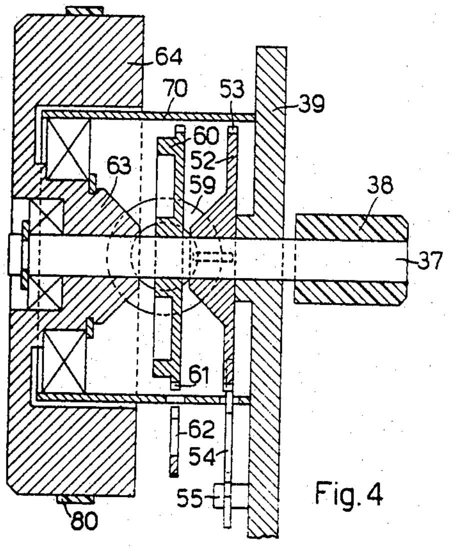
FIG. 4 is a section of the starting and stopping device taken on the line IV—IV of FIG. 3.

The device 41 for controlling the starting and stopping of the driving shaft 37 and consequently of the tape 3, which device is housed inside a covering cylinder 70 held by the supporting frame 39, is a differential device and is shown diagrammatically in greater detail in FIG. 3, which is a front view, and in FIG. 4, which is a vertical section on the line IV—IV of FIG. 3. Fixed on the shaft 37 is a conical disc 52 which forms a crown wheel of the differential device and carries a toothed rim 53 at its periphery. A stop pawl 54 pivoted on a pin 55 fixed to the frame 39 engages in the toothed rim 53. In a symmetrical position with respect to the shaft 37 there is another pin 56 on which there is pivoted a second stop pawl 57 which, together with the pawl 54, engages in the toothed rim 53 in scissors fashion. This second pawl 57 prevents oscillations of the conical disc 52 which would occur if only the stop pawl 54 were to act on the toothed rim 53.

The two pawls 54 and 57 are both pulled against the toothed rim by a spring 58 attached to both pawls. The conical disc 52 may be covered with rubber so as to be rotated more satisfactorily through friction by three planet wheels 59 covered in the same way with rubber and journalled in a planet-wheel carrier 60. The planet-wheel carrier 60 carries at its periphery a gear 61 which can be engaged by a starting pawl 62 pivoted on the pin 56 and fast with the stop pawl 57. The planet wheels engage a second crown wheel, that is a second conical disc 63 which is thus able to impart its rotary movement by friction to the planet wheels 59, with which it is in contact. Supported by ball bearings inside the conical disc 63 is a stabilizer or flywheel 64 which stabilizes the speed of rotation impressed on the shaft 37 by the motor 40 conected to the stabilizer by a belt 80.

The stop or reverse-movement pawl 57 is provided with a projection 66 which co-operates with a projection 67 of the stop pawl 54 and is moved by a lever 68 controlled by an electromagnet 71. In the full-line position of FIG. 3, the electromagnet 71 is deenergized and the projection 66 is therefore down. Due to the spring 58 the two stop pawls 54 and 57 therefore engage in scissors fashion in the toothed rim 53 of the conical disc 52 and, consequently, hold the shaft 37 and, as a result, the tape 3 locked. The rotation imparted by the motor 40 to the stabilizer 64 simply spins the carrier 60 about the axis of the shaft 37, this movement of the carrier not being prevented by the pawl 62.

On the other hand, when the electromagnet 71 is energized, the lever 68 is pulled, so that the projection 66 rises and lifts the projection 67 alongside it, thereby overcoming the action of the spring 58. The two stop pawls 54 and 57 therefore open, releasing the toothed rim 53, while the starting pawl 62 engages the gear 61 located on the planet-wheel carrier 60, locking the same. The rotation impressed on the stabilizer 64 by the motor 40 is therefore transmitted by friction through the medium of the conical wheel 63 to the three planet wheels 59, which respectively rotate on their axes.

The planet-wheel carrier 60 being locked by the pawl 62, the rotation of the planet wheels on their own axes is imparted to the conical disc 52, which is free from the pawls 54 and 57. The rotation of the conical disc 52 is imparted to the driving shaft 37 fast therewith and, consequently, to the tape 3 through the hollow driving roller 27.

By again deenergizing the electromagnet 71, the lever 68 is no longer attracted, so that the two pawls 54 and 57 engage the toothed rim 53, locking the conical disc 52 and in this way stopping the rotation of the shaft 37 and, consequently, the driving of the tape 3 inside the cassette.

I claim:

1. A cassette for storing an endless belt of tape and a mechanism separable from the cassette for driving the tape; said cassette comprising a case, and a roller mounted for rotation in said case for driving the tape, said roller having an axial cavity therein opening externally of the case; and said mechanism comprising a driving shaft frictionally engageable with said roller internally of said cavity for driving the roller, said shaft having a diameter less than the diameter of said cavity so that the shaft engages the roller along a generatrix of the cavity, and means for driving said shaft.

2. A cassette and drive mechanism as recited in claim 1, wherein the drive mechanism further comprises means for moving the cassette radially with respect to the shaft after the shaft has been inserted into the cavity.

3. A cassette and drive mechanism as recited in claim 2; wherein the cassette further comprises two pins affixed to the case and extending therefrom perpendicular to the axis of rotation of the roller on opposite side of the roller; and wherein the drive mechanism further comprises two hooks movable into contact with the pins after the shaft has been inserted into the cavity for effecting movement of the cassette radially with respect to the shaft.

4. A cassette and drive mechanism as recited in claim 3, wherein the drive mechanism further comprises two guides for slideably engaging the pins as the shaft is inserted into the cavity.

5. A cassette and drive mechanism as recited in claim 1; wherein the cassette further comprises a wall positioned internally of said case and dividing the case into two housings, said wall having two apertures therein communicating between said housings, a plurality of bunched loops of said endless belt of tape being stored in one of said housings, and at least one electromagnetic head and said driving roller being mounted in the other of said housings, whereby a loop of tape extends from said one housing into said other housing through said apertures and in said other housing passes around the driving roller and adjacent the head.

6. A cassette and drive mechanism as recited in claim 5, wherein the cassette further comprises a pressure roller mounted for rotation in said other housing and bearing against said driving roller for pressing the tape thereagainst, and means mounting said pressure roller for rotation about an axis perpendicular to the axis of rotation of the driving roller so that the pressure roller will follow wandering movements of the tape on the driving roller.

7. A cassette and drive mechanism as recited in claim 6, wherein the cassette further comprises a braking pad mounted in said other housing and bearing against the tape for maintaining constant tape tension between the pad and the driving roller.

8. A cassette and drive mechanism as recited in claim 7, wherein the cassette further comprises a cylinder mounted in said other housing and over which the tape is slideable, said pad bearing against said cylinder for pressing the tape thereagainst, and means mounting said pad for rotation about an axis perpendicular to the axis of the cylinder so that the pad will follow wandering movements of the tape on the cylinder.

9. A cassette and drive mechanism as recited in claim 1, wherein at least one of the engageable surfaces of said driving roller and said driving shaft has a covering of elastomeric material.

10. A cassette and drive mechanism as recited in claim 1, wherein said drive means includes a differential device, said device comprising, an input crown wheel rotatable with respect to said shaft, an output crown wheel fixed to the shaft and having a toothed periphery, a carrier rotatable with respect to the shaft and having a toothed periphery, a plurality of planet wheels rotatably mounted on said carrier and engaging said input and output crown wheels, at least one stopping pawl engageable with the periphery of said output crown wheel for selectively preventing rotation of the shaft, and a starting pawl engageable with the periphery of said carrier for drivingly connecting said input crown wheel to said output crown wheel through said planet wheels to selectively impart rotation to the shaft, said stopping pawl being engaged with said output crown wheel only when said starting pawl is disengaged from said carirer and said starting pawl being engaged with said carrier only when said stopping pawl is disengaged from said output crown wheel.

11. A cassette and drive mechanism as recited in claim 10, wherein said differential device further comprises an electromagnet operatively connected to said stopping and starting pawls for operating the pawls.

References Cited

UNITED STATES PATENTS

| | | | |
|---|---|---|---|
| 3,186,195 | 6/1965 | Braun | 226—188 X |
| 3,411,686 | 11/1968 | Bender | 226—194 X |

ALLEN N. KNOWLES, Primary Examiner

U.S. Cl. X.R.

226—187, 188, 194, 195